US011269879B2

(12) United States Patent
Cisek et al.

(10) Patent No.: US 11,269,879 B2
(45) Date of Patent: Mar. 8, 2022

(54) OPTIMAL QUERY SCHEDULING ACCORDING TO DATA FRESHNESS REQUIREMENTS

(71) Applicant: Google LLC, Mountain View, CA (US)

(72) Inventors: Julius Cisek, Alameda, CA (US); Gaurav Kumar, Berkeley, CA (US); Shaunak Mistry, Scotts Valley, CA (US); Kalen Petersen, Olympia, WA (US)

(73) Assignee: Google LLC, Mountain View, CA (US)

( * ) Notice: Subject to any disclaimer, the term of this patent is extended or adjusted under 35 U.S.C. 154(b) by 46 days.

(21) Appl. No.: 16/741,733

(22) Filed: Jan. 13, 2020

(65) Prior Publication Data

US 2021/0216547 A1 Jul. 15, 2021

(51) Int. Cl.
*G06F 16/2453* (2019.01)
*G06F 16/21* (2019.01)
*G06F 16/2455* (2019.01)
*G06F 16/2458* (2019.01)

(52) U.S. Cl.
CPC ...... *G06F 16/24537* (2019.01); *G06F 16/217* (2019.01); *G06F 16/2455* (2019.01); *G06F 16/2477* (2019.01)

(58) Field of Classification Search
CPC ............. G06F 16/24537; G06F 16/217; G06F 16/2455; G06F 16/2477
USPC ................................................. 707/723, 713
See application file for complete search history.

(56) References Cited

U.S. PATENT DOCUMENTS

| | | | | |
|---|---|---|---|---|
| 6,334,128 | B1* | 12/2001 | Norcott | G06F 16/2393 |
| 6,772,331 | B1* | 8/2004 | Hind | H04W 12/50 713/151 |
| 9,424,315 | B2* | 8/2016 | Chamdani | G06F 9/4881 |
| 2008/0222362 | A1* | 9/2008 | Chang | G06Q 10/10 711/133 |
| 2008/0222642 | A1* | 9/2008 | Kakarla | G06F 9/5077 718/104 |
| 2009/0106198 | A1* | 4/2009 | Srinivasan | G06F 16/24556 |
| 2010/0312762 | A1* | 12/2010 | Yan | G06F 16/24532 707/716 |
| 2010/0318495 | A1* | 12/2010 | Yan | G06F 16/27 707/618 |
| 2010/0318559 | A1* | 12/2010 | Yan | G06F 16/2471 707/769 |

(Continued)

*Primary Examiner* — Hanh B Thai
(74) *Attorney, Agent, or Firm* — Honigman LLP; Brett A. Krueger

(57) ABSTRACT

A process for optimal query scheduling includes receiving in an information retrieval data processing system, a request to accelerate query execution of a specified query to a time prior to a scheduled time. A specific field corresponding to data in a database is then identified in the query and a freshness of data requirement for the specific field retrieved along with a frequency of change the data corresponding to the specific field. Then, if execution of the specific query at the time prior to the scheduled time instead of the scheduled time is determined not to violate the freshness of data requirement based upon the frequency of change of the data corresponding of the specific field, the specific query is scheduled for execution at the time prior to the scheduled time. But otherwise, the scheduled time may be maintained for executing the specific query.

12 Claims, 2 Drawing Sheets

(56) References Cited

U.S. PATENT DOCUMENTS

| | | | | |
|---|---|---|---|---|
| 2012/0307624 A1* | 12/2012 | Vasseur | ............... | H04L 41/0659 370/221 |
| 2014/0223444 A1* | 8/2014 | Keeton | .................... | G06F 9/50 718/104 |
| 2016/0378564 A1* | 12/2016 | Gaurav | .................... | G06F 9/50 718/1 |
| 2017/0046412 A1* | 2/2017 | Levy | ................... | G06F 16/2453 |
| 2017/0078373 A1* | 3/2017 | Hayavadana | ....... | H04L 41/0896 |
| 2017/0140055 A1* | 5/2017 | Grehant | ................. | H04L 67/42 |
| 2018/0293147 A1* | 10/2018 | Bikumala | .............. | G06N 20/00 |
| 2018/0307727 A1* | 10/2018 | Lucas | .............. | G06F 16/24553 |
| 2019/0095488 A1* | 3/2019 | Bhattacharjee | ..... | G06F 16/2228 |

* cited by examiner

OPTIMAL QUERY SCHEDULING ACCORDING TO DATA FRESHNESS REQUIREMENTS

BACKGROUND OF THE INVENTION

Field of the Invention

The present invention relates to the field of query scheduling and more particularly to the pre-scheduling of queries for execution before a requested query execution time.

Description of the Related Art

A query is a request for information from an information retrieval system. There are three general methods for posing queries: menu driven, querying by example and query language formulation. In the first instance, a query is formulated and issued based upon the selection of parameters in a menu. In the second instance, the information retrieval system presents a blank record and allows the end user to specify the fields and values that define the query. In the third instance, the end user formulates the query utilizing a stylized query written in a query language. The latter is the most complex method because it requires the use of a specialized language, but the latter is also the most powerful as it is the least constrained mode of querying an information retrieval system.

Queries generally are issued either on demand through a query interface, or programmatically at the time of executing a computer program. But, queries also may be issued in batch mode. That is to say, a query may be specified at one time, but execution of the query against the information retrieval system may be deferred to a later time. In this regard, in an information retrieval system, it is common for multiple users to concurrently submit queries to the database for execution. Consequently, if the information retrieval system lacks sufficient computing resources to execute all of the submitted queries simultaneously, the information retrieval system must defer execution of one or more of those queries while only a subset of the queries may be processed immediately. The process of determining which queries to defer and at what time the deferred queries are to execute is known as query scheduling.

One way to perform query scheduling is to execute incoming queries in the order they arrive referred to as a "first-come-first-serve" approach. However, the first-come-first serve approach cannot differentiate between queries that have differing response time requirements, some queries being more time sensitive than others. If queries are simply scheduled according to order of arrival, some time-sensitive queries may be forced to wait behind time-insensitive queries, which can adversely affect the usability and responsiveness of the information retrieval system.

Query scheduling also may be performed according to fixed priority. In fixed priority scheduling, each query is assigned a priority based on one or more properties known at the time of query arrival such as the identity or type of the query requestor. Thereafter, each query may be scheduled according to an assigned priority. As can be seen, fixed priority scheduling avoids the problems of the first-come-first-serve approach since time-sensitive queries can be prioritized over less time-sensitive queries. Yet, fixed priority scheduling cannot account for "heavy" queries that take a relatively long time to execute and "light" queries that take a relatively short time to execute, such as on the order of milliseconds or seconds.

BRIEF SUMMARY OF THE INVENTION

Embodiments of the present invention address deficiencies of the art in respect to query scheduling and provide a novel and non-obvious method, system and computer program product for optimal query scheduling according to data freshness requirements. In an embodiment of the invention, a process for optimal query scheduling includes receiving in an information retrieval data processing system, a request to accelerate query execution of a specified query to a time prior to a scheduled time. A specific field is then identified in the specified query that corresponds to data in a database. Thereafter, a freshness of data requirement for the specific field is retrieved along with a frequency of change the data corresponding to the specific field. It is then determined if execution of the specific query at the time prior to the scheduled time will violate the freshness of data requirement based upon the frequency of change of the data corresponding to the specific field. The specific query is then scheduled for execution at the time prior to the scheduled time only if the execution of the specific query is determined not to violate the freshness of data requirement. But otherwise, the scheduled time is maintained for executing the specific query.

In one aspect of the embodiment, the time prior is a time that is under-scheduled with fewer scheduled queries consuming fewer resources of the information retrieval data processing system than available resources of the information retrieval data processing system at the located time and that has enough of the available resources to support execution of the specific query. In another aspect of the embodiment, the method further includes maintaining the scheduled time for executing the specific query even though the specific query is determined not to violate the freshness of data requirement on condition that it is determined that the specific query has an estimated cost of execution that is below a threshold value. In yet another aspect of the embodiment, the estimated cost of execution is computed by matching at least a portion of each of the specific query to an entry in a table of queries fragments and corresponding historical execution times.

In another embodiment of the invention, an information retrieval data processing system is adapted for optimal query scheduling according to data freshness requirements. The system includes a host computing platform having one or more computers each with memory and at least one processor. The system further includes a query interface coupled to a database. The query interface receives from requesters from over a computer communications network, requests to schedule queries against the database, and in response, schedules the queries for execution so as to return different results sets to the requesters. Finally, the system includes an optimal query scheduling module.

The module includes computer program instructions that when executing in the memory of the host computing platform, are operable to receive a request to accelerate query execution of a specified query to a time prior to a scheduled time and to identify in the specified query, a specific field corresponding to data in a database. The program instructions further are enabled to retrieve a freshness of data requirement for the specific field and a frequency of change the data corresponding to the specific field, and to determine if execution of the specific query at the time prior to the scheduled time instead of the scheduled time violates the freshness of data requirement based upon the frequency of change of the data corresponding of the specific field. Finally, the program instructions are enabled to schedule the specific query for execution at the time prior to the scheduled time on condition that the execution of the specific query is determined not to violate the freshness of data requirement by scheduling the specific query at the time prior to the scheduled time. But otherwise, the program instructions are enabled to maintain the scheduled time for executing the specific query.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the optimal query scheduling of one or more queries in an information retrieval data processing system according to data freshness requirements. In accordance with an embodiment of the invention, a request may be received in the information retrieval data processing system for the acceleration of query execution of a specified query from the scheduled time, to a time prior to a scheduled time. In response to the receipt of the request, a specific field that corresponds to data in a database may be identified within the specified query. As well, a freshness of data requirement is retrieved for the specific field as is a frequency of change the data corresponding to the specific field. Thereafter, it may be determined if execution of the specific query at the time prior to the scheduled time instead of the scheduled time violates the freshness of data requirement based upon the frequency of change of the data corresponding of the specific field. On the condition that the execution of the specific query is determined not to violate the freshness of data requirement by scheduling the specific query at the time prior to the scheduled time, the specific query may be scheduled for execution at the time prior to the scheduled time. But, otherwise the scheduled time for executing the specific query may be maintained.

Figure 1:
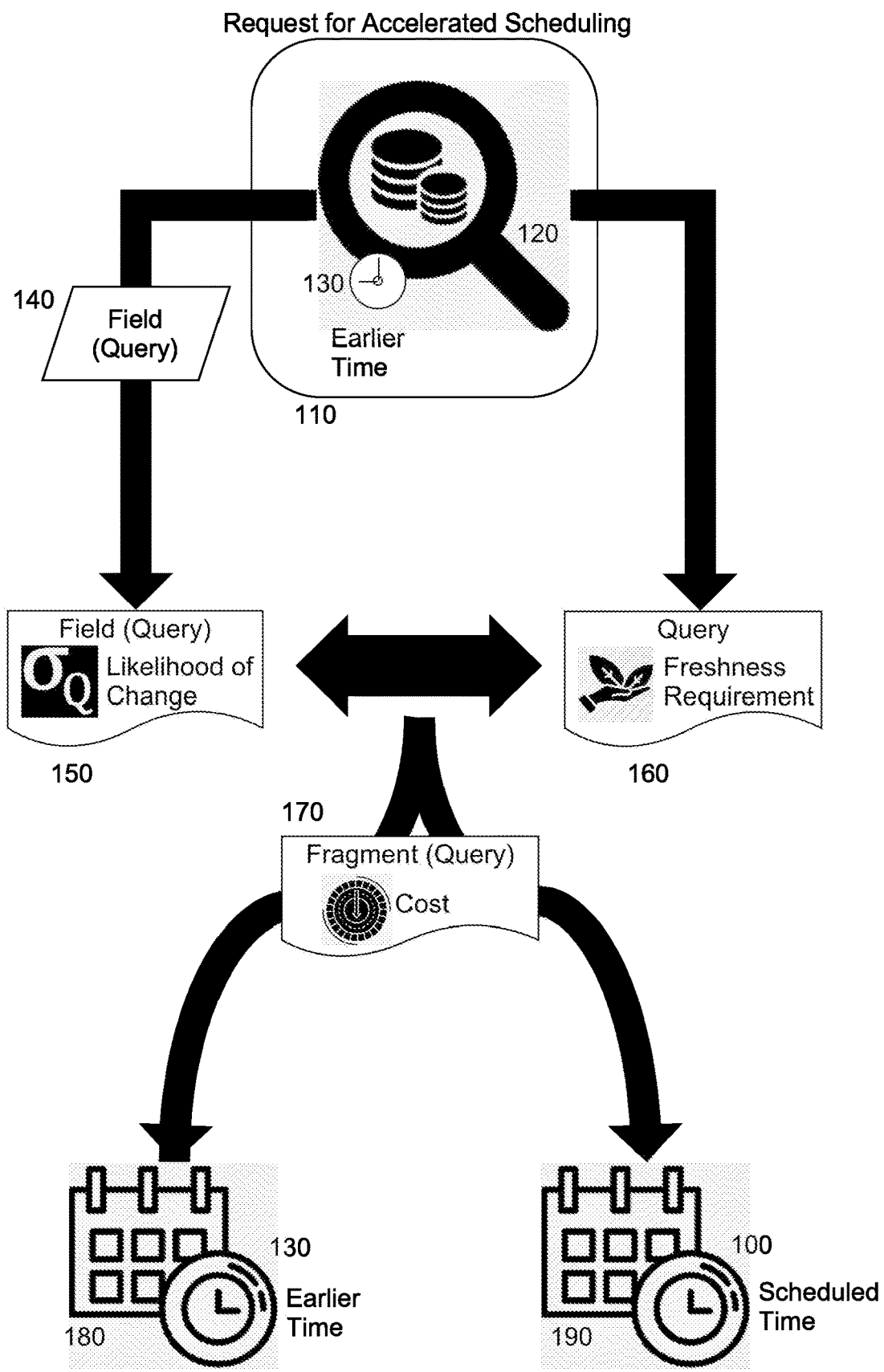
FIG. 1 is pictorial illustration of a process for optimal query scheduling according to data freshness requirements.

In further illustration of an exemplary embodiment of the invention, FIG. 1 pictorially shows a process for optimal query scheduling for an information retrieval data processing system according to data freshness requirements. As shown in FIG. 1, a request 110 is received requesting the acceleration of the scheduling of a query 120 to a specified time 130 earlier than an existing scheduled time for the query. A field 140 of a database or data model implicated by the query 120 is identified. Thereafter, a data freshness requirement 160 for the field 140 is retrieved—specifically, a previously stored indication of how recently updated data for the field 140 must be at the time of executing a query accessing data in the field 140, whether directly are as part of an aggregation. As well, an observed volatility 150 of the field 140 is retrieved—specifically, an indication of how frequently the data in the field 140 has been updated in the past.

Thereafter, the freshness requirement 160 is compared to the observed volatility 150 at the specified time 130 relative to a time at which the request 110 had been received in order to determine the expected freshness of data in the field 140 at the specified time 130. To the extent that the acceleration of scheduling of the query 120 to the specified time 130 will lead to a violation of the freshness requirement 160, the request 110 is rejected and the query 120 remains in the schedule 100 for execution at the previously scheduled time 190. But otherwise, the query 120 is rescheduled in the schedule 100 to the specified time 130. Optionally, an execution cost 170 of the query 120 is determined based upon at least a portion of the query 120. To the extent that the execution cost is below a threshold value, no re-scheduling to the specified time 130 is permitted.

Figure 2:
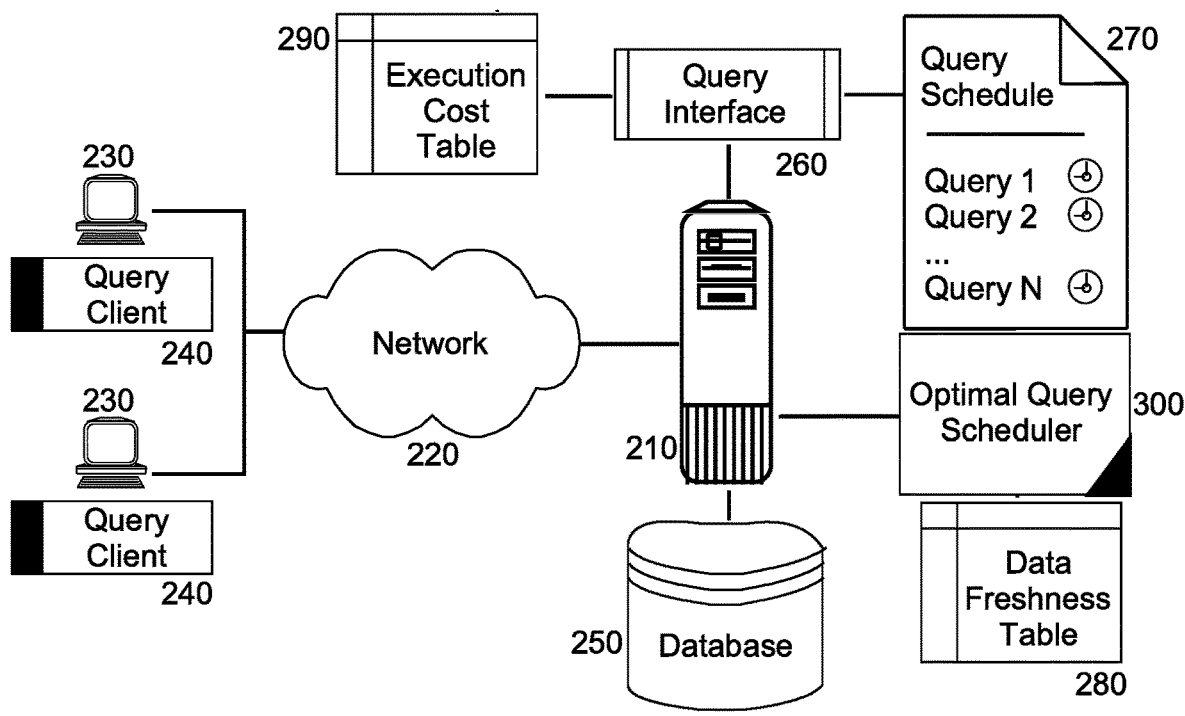
FIG. 2 is a schematic illustration of an information retrieval data processing system configured for optimal query scheduling according to data freshness requirements; and, FIG. 3 is a flow chart illustrating a process for optimal query scheduling according to data freshness requirements.

The process described in connection with FIG. 1 can be implemented within an information retrieval data processing system. In further illustration, FIG. 2 schematically shows an information retrieval data processing system configured for optimal query scheduling. The system includes a host computing platform 210 that includes one or more computers, each with memory and at least one processor. The system also includes a query interface 260 to a database 250 (or a data model modeling data in the database 250). The query interface 260 is configured to receive queries from over computer communications network 220 from query clients 240 executing in respectively different computing devices 230, and to schedule the execution of each of the received queries in a query schedule 270, with each of the queries being assigned a specific time (day/date/time or any combination thereof) for execution. The query interface 260 further is configured to provide to requesting ones of the query clients 240, corresponding results for submitted and executed queries.

Of importance, the system includes an optimal query scheduler module 300. The module 300 includes computer program instructions which when executed in the host computing platform 210, are enabled to receive from the query clients 240, individual requests to accelerate the execution of a specified query to a time prior to a previously scheduled time. The computer program instructions additionally are enabled upon execution to consult an execution cost table 290 correlating different query portions to known execution costs in order to identify an entry in the table 290 matching a portion of the specified query so as to predict an execution cost of the specified query.

The computer program instructions are further enabled during execution, to the extent that the predicted execution cost exceeds a threshold value, so as to warrant acceleration of scheduling, to identify a field implicated by the specified query and determine in a data freshness table 280 a known volatility of data for the identified field and a required freshness of data for the identified field at a time of executing a query implicating the field. Finally, the computer program instructions are enabled during execution to accelerate the scheduling of the execution of the query to the time to the previously scheduled time in the query schedule 270 so long as the determined volatility for the specified query does not produce data with a freshness value that falls below the freshness requirement, e.g. the data will have likely changed subsequent to the requested time and prior to the previously scheduled time. But otherwise, the computer program instructions are enabled to reject the request for accelerated scheduling in the query schedule 270.

Figure 3:
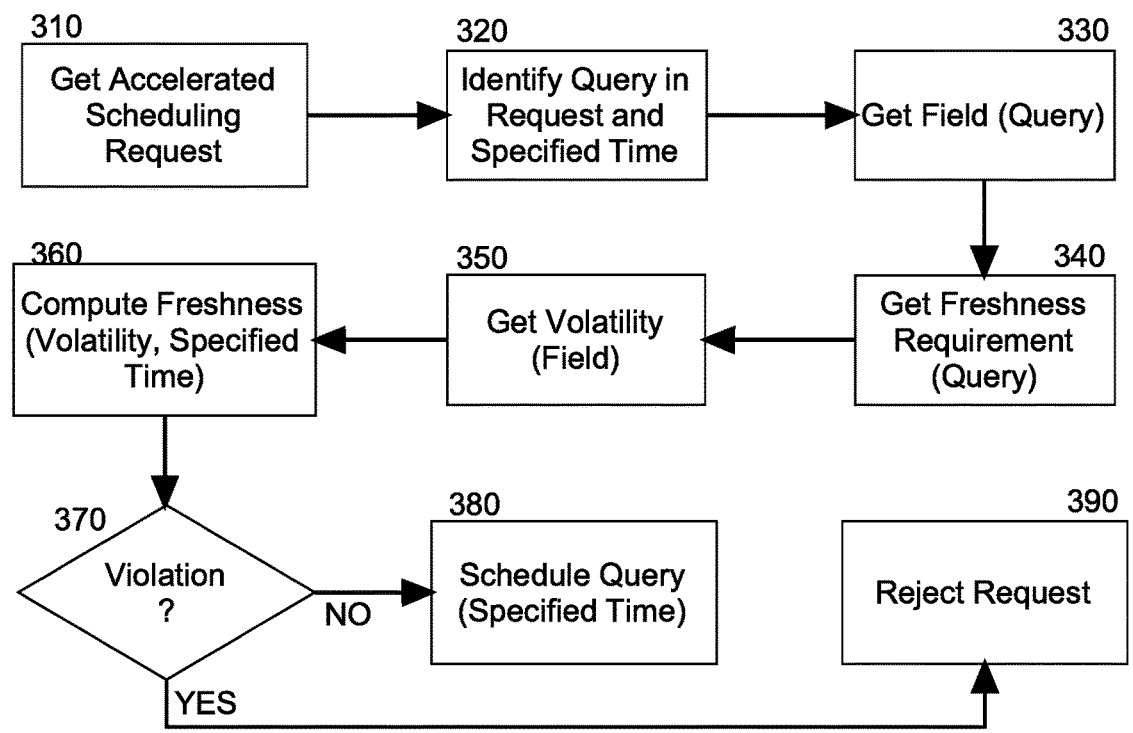

In even yet further illustration of the operation of the optimal query scheduler module 300, FIG. 3 is a flow chart illustrating a process for optimal query scheduling for an information retrieval data processing system. Beginning in block 310, a request to accelerate the scheduling of a query to a time prior to a previously scheduled time is received. In block 320, a query implicated by the request is identified along with the specified time for rescheduling. In block 330, a field implicated by the query is selected and in block 340, a freshness requirement for the field is retrieved.

Then, in block 350, an observed volatility of the field is also retrieved and in block 360, the freshness of data in the field is predicted for the specified time based upon the observed volatility. In this regard, a data freshness table may continuously or periodically update a measure of how frequently data for different fields in the database or data model are updated. In decision block 370, the predicted freshness is compared to the freshness requirement in order to determine if rescheduling the query to the specified time will violate the freshness requirement. That is, if it is determined that the data for the field is predicted to update in the period between the specified time and the previously scheduled time rendering the data premature and un-fresh at the specified time, a violation will have occurred. If not, the query is re-scheduled to the specified time prior to the previously scheduled time. But otherwise, in block 390, the request is rejected.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for optimal query scheduling comprising:
receiving, at an information retrieval data processing system configured to manage queries across multiple different computing devices, a query acceleration request requesting that a query previously scheduled to execute at a scheduled time be accelerated to execute at a time prior to the scheduled time;
identifying a specific field from the previously scheduled query, the specific field corresponding to data in a database;
retrieving a freshness of data requirement for the specific field from the previously scheduled query and a frequency of change of the data corresponding to the specific field from the previously scheduled query;
determining if execution of the previously scheduled query at the time prior to the scheduled time instead of the scheduled time violates the freshness of data requirement based upon the frequency of change of the data corresponding of the specific field; and
on condition that the execution of the previously scheduled query is determined not to violate the freshness of data requirement by scheduling the previously scheduled query at the time prior to the scheduled time, rescheduling the previously scheduled query for execution at the time prior to the scheduled time, but otherwise maintaining the scheduled time for executing the previously scheduled query.

2. The method of claim 1, wherein the time prior is a time that is under-scheduled with fewer scheduled queries consuming fewer resources of the information retrieval data processing system than available resources of the information retrieval data processing system at the located time and that has enough of the available resources to support execution of the previously scheduled query.

3. The method of claim 1, further comprising maintaining the scheduled time for executing the previously scheduled query even though the previously scheduled query is determined not to violate the freshness of data requirement on condition that it is determined that the previously scheduled query has an estimated cost of execution that is below a threshold value.

4. The method of claim 3, wherein the estimated cost of execution is computed by matching at least a portion of each of the previously scheduled query to an entry in a table of queries fragments and corresponding historical execution times.

5. An information retrieval data processing system adapted for optimal query scheduling, the system comprising:
a host computing platform comprising one or more computers each with memory and at least one processor;
a query interface coupled to a database and configured to:
receive, from requesters executing multiple different computing devices over a communications network, requests to schedule queries against the database, and
schedule the queries for execution and returning different results sets responsive to the queries to the requesters; and
an optimal query scheduling module comprising computer program instructions that when executing in the memory of the host computing platform, perform operations comprising:
receiving in an information retrieval data processing system, a query acceleration request requesting that a query previously scheduled to execute at a scheduled time be accelerated to execute at a time prior to the scheduled time;
identifying a specific field from the previously scheduled query, the specific field corresponding to data in a database;
retrieving a freshness of data requirement for the specific field from the previously scheduled query and a frequency of change the data corresponding to the specific field;
determining if execution of the previously scheduled query at the time prior to the scheduled time instead of the scheduled time violates the freshness of data requirement based upon the frequency of change of the data corresponding of the specific field; and
on condition that the execution of the previously scheduled query is determined not to violate the freshness of data requirement by scheduling the previously scheduled query at the time prior to the scheduled time, rescheduling the previously scheduled query for execution at the time prior to the scheduled time, but otherwise maintaining the scheduled time for executing the previously scheduled query.

6. The system of claim 5, wherein the time prior is a time that is under-scheduled with fewer scheduled queries consuming fewer resources of the information retrieval data processing system than available resources of the information retrieval data processing system at the located time and that has enough of the available resources to support execution of the previously scheduled query.

7. The system of claim 5, wherein the program instructions are further enabled to maintain the scheduled time for executing the previously scheduled query even though the previously scheduled query is determined not to violate the freshness of data requirement on condition that it is determined that the previously scheduled query has an estimated cost of execution that is below a threshold value.

8. The system of claim 7, wherein the estimated cost of execution is computed by matching at least a portion of each of the previously scheduled query to an entry in a table of queries fragments and corresponding historical execution times.

9. A computer program product for optimal query scheduling, the computer program product including a computer readable storage medium having program instructions embodied therewith, the program instructions executable by a device to cause the device to perform a method including:

receiving, at an information retrieval data processing system configured to manage queries across multiple different computing devices, a query acceleration request requesting that a query previously scheduled to execute at a scheduled time be accelerated to execute at a time prior to the scheduled time;

identifying a specific field from the previously scheduled query, the specific field corresponding to data in a database;

retrieving a freshness of data requirement for the specific field from the previously scheduled query and a frequency of change the data corresponding to the specific field from the previously scheduled query;

determining if execution of the previously scheduled query at the time prior to the scheduled time instead of the scheduled time violates the freshness of data requirement based upon the frequency of change of the data corresponding of the specific field; and on condition that the execution of the previously scheduled query is determined not to violate the freshness of data requirement by scheduling the previously scheduled query at the time prior to the scheduled time, rescheduling the previously scheduled query for execution at the time prior to the scheduled time, but otherwise maintaining the scheduled time for executing the previously scheduled query.

10. The computer program product of claim 9, wherein the time prior is a time that is under-scheduled with fewer scheduled queries consuming fewer resources of the information retrieval data processing system than available resources of the information retrieval data processing system at the located time and that has enough of the available resources to support execution of the previously scheduled query.

11. The computer program product of claim 9, wherein the method further comprises maintaining the scheduled time for executing the previously scheduled query even though the previously scheduled query is determined not to violate the freshness of data requirement on condition that it is determined that the previously scheduled query has an estimated cost of execution that is below a threshold value.

12. The computer program product of claim 11, wherein the estimated cost of execution is computed by matching at least a portion of each of the previously scheduled query to an entry in a table of queries fragments and corresponding historical execution times.

* * * * *